United States Patent
Truong

(10) Patent No.: US 8,493,609 B2
(45) Date of Patent: Jul. 23, 2013

(54) METHOD FOR GENERATING SIMULATED INSERT SHEETS FOR A PRINT JOB

(75) Inventor: Duc Phu Truong, West Covina, CA (US)

(73) Assignee: Konica Minolta Laboratory U.S.A. Inc., San Mateo, CA (US)

( * ) Notice: Subject to any disclaimer, the term of this patent is extended or adjusted under 35 U.S.C. 154(b) by 1504 days.

(21) Appl. No.: 12/030,850

(22) Filed: Feb. 13, 2008

(65) Prior Publication Data

US 2009/0201534 A1    Aug. 13, 2009

(51) Int. Cl.
*G06F 15/16* (2006.01)
*G03G 15/00* (2006.01)

(52) U.S. Cl.
USPC ............ 358/1.18; 709/229; 399/23; 399/382; 399/389

(58) Field of Classification Search
USPC ... 358/1.15, 1.18; 399/382, 389, 23; 707/101; 709/229
See application file for complete search history.

(56) References Cited

U.S. PATENT DOCUMENTS

| | | | |
|---|---|---|---|
| 4,201,464 A | 5/1980 | Botte et al. | |
| 5,316,279 A | 5/1994 | Corona et al. | |
| 5,709,374 A | 1/1998 | Taylor et al. | |
| 6,666,605 B2 | 12/2003 | Mantell | |
| 6,765,685 B1 | 7/2004 | Yu | |
| 7,651,286 B2 * | 1/2010 | Tischler | 400/62 |
| 2005/0002679 A1 * | 1/2005 | Phillips et al. | 399/23 |
| 2005/0185220 A1 | 8/2005 | Martinez | |
| 2006/0012817 A1 | 1/2006 | Wu | |
| 2006/0115307 A1 * | 6/2006 | Axten et al. | 399/389 |
| 2006/0136450 A1 | 6/2006 | Barrus | |
| 2006/0228137 A1 * | 10/2006 | Steele | 399/382 |
| 2007/0061474 A1 * | 3/2007 | Quach et al. | 709/229 |
| 2007/0263242 A1 | 11/2007 | Takahashi | |

* cited by examiner

*Primary Examiner* — Akwasi M Sarpong
(74) *Attorney, Agent, or Firm* — ChenYoshimura LLP

(57) ABSTRACT

A printing method is described where, when a print job requires printing multiple copies of a document and a simulated insert sheet option is selected as a part of the print job requirements, simulated insert sheets are automatically generated and inserted between the printed copies that are outputted to the output tray of the printer. The simulated insert sheets are printed using the same paper as the document. The simulated insert sheets may be numbered, and may include a printed pattern extending to an edge of the sheets. The layout and content of the simulated insert sheets may be specified by the printer driver or the printer itself. The method can also be used with copiers when making multiple copies of an original document. Further, simulated insert sheets can be used to separate groups of pages within a single document, such as chapters or sections.

24 Claims, 4 Drawing Sheets

METHOD FOR GENERATING SIMULATED INSERT SHEETS FOR A PRINT JOB

BACKGROUND OF THE INVENTION

1. Field of the Invention

This invention relates to methods of printing documents from a computer, and in particular, it relates to methods of generating simulated insert sheets for a print job that includes multiple copies of the documents.

2. Description of Related Art

Insert sheets are used to separate hard copies generated from a print job when they are stacked up one on top of another in the output tray of the printer, so that each copy of the printed document is physically separated from another copy by an insert sheet. Insert sheets are usually made of special types of paper which are situated in a reserved tray of the printer, and the printer inserts them while printing the copies. There are many problems associated with using insert sheets. For example, insert sheets take away one valuable paper tray which can be otherwise used to hold regular printing paper. Also, insert sheets are made of special paper; therefore they cannot be replaced by regular printing paper when the printer runs out of insert sheets. In addition, while printing a job containing insert sheets, if the printer runs out of insert sheets, the print job will be suspended until insert sheets are supplied to the printer, causing interruption and delay.

SUMMARY

Embodiments of the present invention overcome the above discussed limitations of existing ways of using insert sheets by providing a process that simulates insert sheets using regular printing paper.

An object of the present invention is to provide a method that allows insert sheets to be generated and inserted into the printed copies without using special paper.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method executed by a printing device for producing a print job, which includes: (a) receiving data representing a document to be printed in the print job; (b) receiving job information about the print job, the job information including an instruction to print multiple copies of the document; (c) printing the requested multiple copies of the document; and (d) printing one or more simulated insert sheets and inserting them between printed copies of the document.

In another aspect, the present invention provides a computer program product comprising a computer usable medium having a computer readable code embodied therein for controlling a printing device, the computer readable program code configured to cause the printing device to execute a process for producing a print job, the process including the steps of: (a) receiving data representing a document to be printed in the print job; (b) receiving job information about the print job, the job information including an instruction to print multiple copies of the document; (c) printing the requested multiple copies of the document; and (d) printing one or more simulated insert sheets and inserting them between printed copies of the document.

In yet another aspect, the present invention provides a printing device which includes: a control and processing section; and a print engine connected to the control and processing section for forming an image on a recording medium, wherein the control and processing section is programmed to receive data representing a document to be printed in the print job, to receive job information about the print job, the job information including an instruction to print multiple copies of the document, to control the print engine to print the requested multiple copies of the document, and to control the print engine to print one or more simulated insert sheets and insert them between printed copies of the document.

In another aspect, present invention provides a method executed by a printing device for producing a print job, which includes: (a) receiving data representing a document to be printed in the print job; (b) receiving job information about the print job, the job information specifying a plurality of page ranges within the document; (c) printing the document; and (d) printing one or more simulated insert sheets and inserting them between adjacent page ranges of the printed document.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 5:
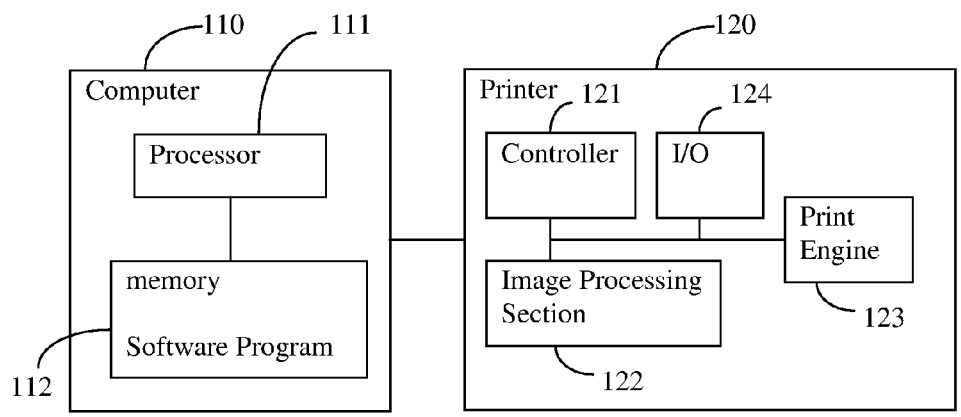
FIG. 5 illustrates a system including a host computer and a printer in which methods according to embodiments of the present invention can be implemented.

The methods described herein can be implemented in a data processing system which includes a host computer and a printer connected to the host computer. A typical structure of the data processing system is shown in FIG. 5. The host computer 110 includes a processor 111 and one or more memories 112 for storing software programs and data (such as files to be printed). The host computer 110 submits print jobs to the printer by transmitting data representing the documents to be printed and information describing the print job. The printer 120 typically includes a controller 121, an image processing section 122, a print engine 123, and an input/output (I/O) section 124. The controller 201 may include a central processing unit (CPU), a random access memory (RAM), and a read only memory (ROM). The controller processes the data and job information received from the host computer 110 to generate a print image. The image processing section 122 carries out various image processing under the control of the controller 121, and sends the processed print image data to the print engine 123. The print engine forms an image on a recording sheet based on the image data sent from the image processing section 122. The I/O section performs data transfer with the host computer 110. The controller 121 is programmed to process data and control various other components of the printer to carry out the various methods described herein.

Figure 1:
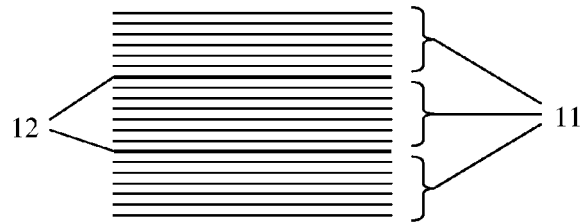
FIG. 1 schematically illustrates an output stack from a printer including multiple copies of a document and simulated insert sheets interposed between copies.
Figure 1A:
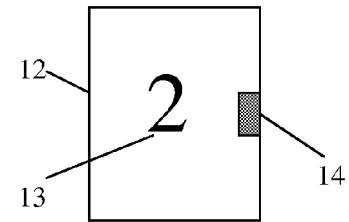
FIG. 1a schematically illustrates a simulated insert sheet.

Embodiments of the present invention provide methods for automatically generating simulated insert sheets and inserting them between the printed sheets that are outputted to the output tray of the printer. FIG. 1 schematically illustrates a stack of output sheets from a printer including a plurality of copies 11 of the printed document and a plurality of simulated insert sheets 12 inserted between copies. In a preferred embodiment, the simulated insert sheets 12 are printed on the same paper as the document, so no separate paper tray is required for supplying the paper for the simulated insert sheet. The simulated insert sheets 12 may be blank (unprinted), or printed with various text, graphics or images, and can be printed in different colors (if the printer is a color printer). The appearance and content of the insert sheets may be uniform for all copies of the print job, or different for different copies. For example, as schematically shown in FIG. 1a, the simulated insert sheets 12 may be numbered sequentially with a number 13 so the copies can be easily counted. They may be printed with a descriptive name for the print job, which may be either specified by the user, or automatically determined (such as the filename of the file being printed). Other desirable information may be included in the simulated insert sheets, such as a company logo, etc. The simulated insert sheets may be color-coded, i.e., different colors may be printed on different insert sheets for the same job, or insert sheets for different print jobs.

In one preferred embodiment, the simulated insert sheets are printed with one or more patterns that extend all the way to one or more edges of the sheets. For example, as schematically shown in FIG. 1a, a small dark block pattern 14 may be printed at the right edge of the sheets, and the location of the block may shift (e.g. downwards in this example) from one sheet to the next to indicate different copies. This facilitates easy separation of the copies that are stacked on top of each other.

Figure 2:
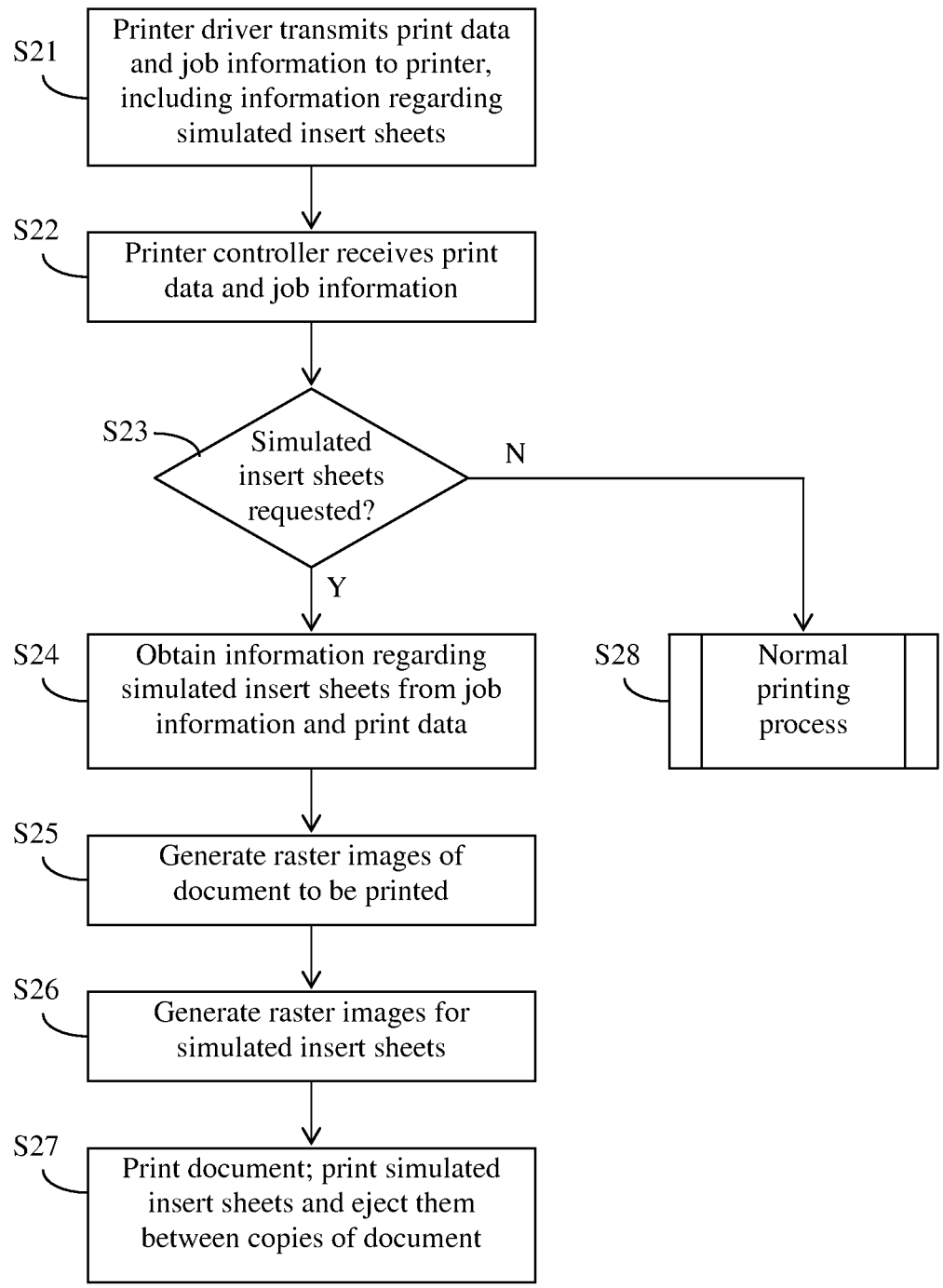
FIG. 2 illustrates a method of generating simulated insert sheets according to an embodiment of the present invention.

In a first implementation of the method, the printing of simulated insert sheets using regular printing paper is accomplished by the host computer 110 and the printer 120 cooperating with each other. FIG. 2 illustrates such a process. First, the printer driver program on the host computer 110 transmits print data representing the document to be printed, along with information describing the print job (referred to as job information, or job ticket) to the printer controller 121 (step S21). The print data may be in a printer language format, commonly referred to as PDL (Page Description Language), such as PostScript or PCL (Printer Command Language). Alternatively, the print data may be in other formats, such as Portable Document Format (PDF) if the printer 120 supports PDF direct printing. The job information may be specified in various standard formats, such as Printer Job Language (PJL), Job Definition Format (JDF), etc., or non-standard formats. The job information includes parameters such as the number of copies to be printed, the size of paper to be used, etc.

According to this implementation, the job information transmitted by the printer driver in step S21 includes a parameter (herein referred to as the insert sheet parameter) that specifies a request for the printer to generate simulated insert sheets. If the printer driver does not request simulated insert sheets for the print job, it will omit the insert sheet parameter or specify a negative value for it. In addition, the job information may include other (optional) items relating to the simulated insert sheet, such as the filename and author of the document (if such information is to be printed on the simulated insert sheets), parameters specifying a logo to be used, parameters specifying the layout or appearance of the simulated insert sheets, parameters specifying colors to be used to print the simulated insert sheet, etc. If the job ticket is in a standard language such as PJL or JDF, special parameters may be defined and used to specify the above-described information regarding simulated insert sheets. Note that the application program on the host computer, such as PDF viewer applications, word processing applications, etc., are not involved in step S21.

Optionally (not shown in FIG. 2), the printer driver may provide a user interface to allow the user to specify various aspects of the simulated insert sheet, such as layout and content. Such layout or content specified by the user are then transmitted to the printer controller in step S21.

In a preferred embodiment, data representing a logo is pre-loaded and stored in the printer controller 121, and the job information in step S21 contains a parameter requesting the printer controller to include the logo on the simulated insert sheets. The logo can be stored in an image format (.tif, .jpg, .bmp, etc.) or in a PDL data format. In addition, multiple logos may be stored in printer controller; the user can select a particular logo via the user interface, and the printer driver includes an appropriate parameter in the jog information to request the user-selected logo. Alternatively, the printer controller may automatically select one of the multiple pre-stored logos based on an identification of the user or computer that is submitting the print job. Further, in the preferred embodiment, the printer controller pre-stores certain layout design options, and the job information includes appropriate parameters to specify one of the pre-stored layout designs. The logos and layout designs can be pre-loaded into the printer controller using a separate utility such as a web application or a windows application that can transfer data to the printer controller via network protocol such as the http protocol or SMP protocol. The utility will also assign an identification code for each pre-loaded logo and layout design, and transmits the identification codes back to the host computer.

It is also possible, as an alternative embodiment, for the host computer to transmit actual data (in a PDL format) representing a logo or a layout design to the printer.

The job ticket in step S21 may be generated by the printer driver program, taking input from the user via a user interface as desired. Alternatively, the user may generate a job ticket in a high level language such as JDF using a program other than the printer driver program, where the job ticket specifies parameters regarding simulated insert sheets.

The printer controller receives the print data and the job information (step S22), and determines whether simulated insert sheets are requested based on the value of the insert sheet parameter or its absence (step S23). If simulated insert sheets are not requested ("N" in step S23), the printer controller executes a normal printing process to print the job (step S28), which is well known in the art and not described in further detail here. If simulated insert sheets are requested ("Y" in step S23), the printer controller obtains the information regarding the simulated insert sheets contained in the job information and print data, if any (step S24). As described earlier, if the job ticket is in a standard language such as PJL or JDF, special parameters are defined to specify the information regarding simulated insert sheets. The printer controller is able to interpret these special parameters. The printer controller then processes the print data received from the host computer to render images of the document to be printed (step S25). This step generally uses the same techniques as the normal printing process. In addition, the printer controller generates images of the simulated insert sheets (step S26).

The images of the simulated insert sheets may be generated in a number of ways. For example, if the job information from the printer driver of the host computer specifies a layout, certain content and/or a pre-stored logo to be included on the simulated insert sheets, the printer controller generates the raster images of the simulated insert sheets accordingly. Alternatively, the printer controller may use a default layout if the job information from the printer driver does not specify a particular layout. The default layout and content may include, for example, a sequential number for each simulated insert sheet, a dark pattern printed at an edge of each sheet, a company logo, etc. The default layout and content are previously stored in the printer controller. The printer controller may allow a user or a system administrator to edit the default layout and content of the simulated insert sheets and store them in the printer controller (such a step will be performed prior to the host computer submitting a document from for printing). The simulated insert sheets may be generated by combining information previously stored in the printer controller, such as a layout or a logo, and information specified by the printer driver in the job information, such as filename, etc. After the raster images of the simulated insert sheets are generated, and any further image processing (optional), the printer prints the multiple copies of the document of the print job, and prints the simulated insert sheets and ejects them between copies of the document (step S27). This step is performed by the print engine 123 under the control of the printer controller 121.

The first implementation can also be applied to generate simulated insert sheets within a document, such as insert sheets used to separate chapters, etc. To accomplish this, the job information specifies the locations of the simulated insert sheets within the document. For example, the JDF language provides a "Run Index" feature allowing the user to specify different finishing options for different page ranges within a document. Using the Run Index, the user may specify various page ranges and request a simulated insert sheet for each page range. As a result, the printer generates simulated insert sheets between adjacent page ranges within the document.

Figure 3:
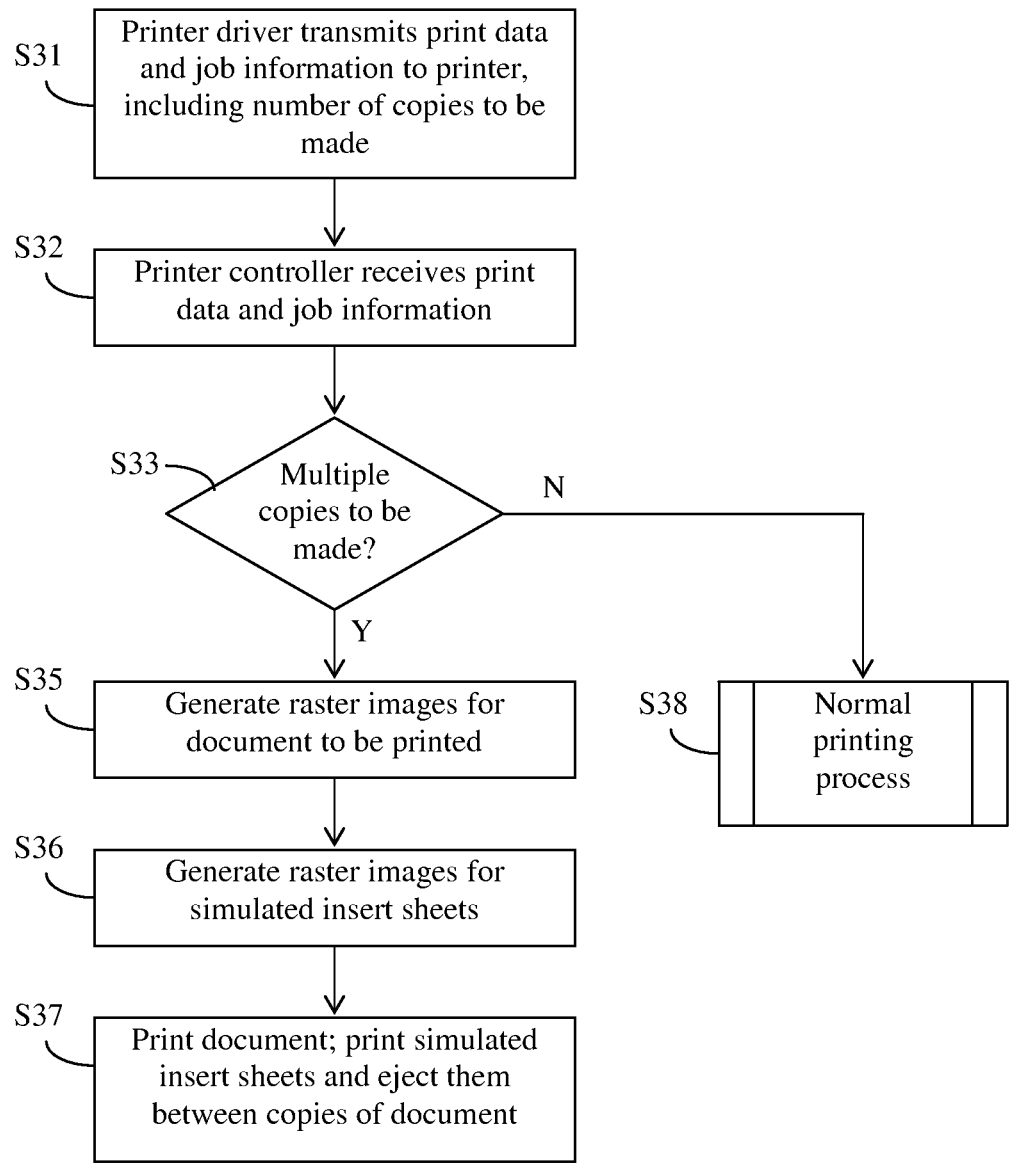
FIG. 3 illustrates another method of generating simulated insert sheets according to an embodiment of the present invention.

In a second implementation, the printing of simulated insert sheets using regular printing paper is accomplished solely by the printer 120. No modification needs to be made to the printer driver program on the host computer 110. FIG. 3 illustrates such a process. Under this approach, the host computer 110 submits the print job (print data and job information) to the printer as in a conventional process, where the job information includes the number of copies of the document to be made (step S31). The printer controller 121 receives the print data and job information (step S32); if multiple copies of the document are to be made ("Y" in step S33), the printer controller generates raster image of simulated insert sheets using a default layout and content (step S36). The default layout may include, as described earlier, a sequential number for each simulated insert sheet, a dark pattern printed at an edge of each sheet, a company logo, etc. The simulated insert sheet may also be user-specific or job-specific (in a similar way as in the first implementation) if the job information received from the host computer includes information such as user name, file name, etc. For example, the user name may be included in the simulated insert sheet. The printer controller also generates raster images of the document as in a normal printing process (step S35). The printer then prints the multiple copies of the document of the print job, and prints the simulated insert sheets and ejects them between copies of the document (step S37). If, on the other hand, the job information specifies that only a single copy is to be made ("N" in step S33), the printer controller executes a normal printing process to print the document (step S38). Similar to the first implementation, the default layout and content for the simulated insert sheet are previously stored in the printer controller, and may be edited by the user or a system administrator.

Figure 4:
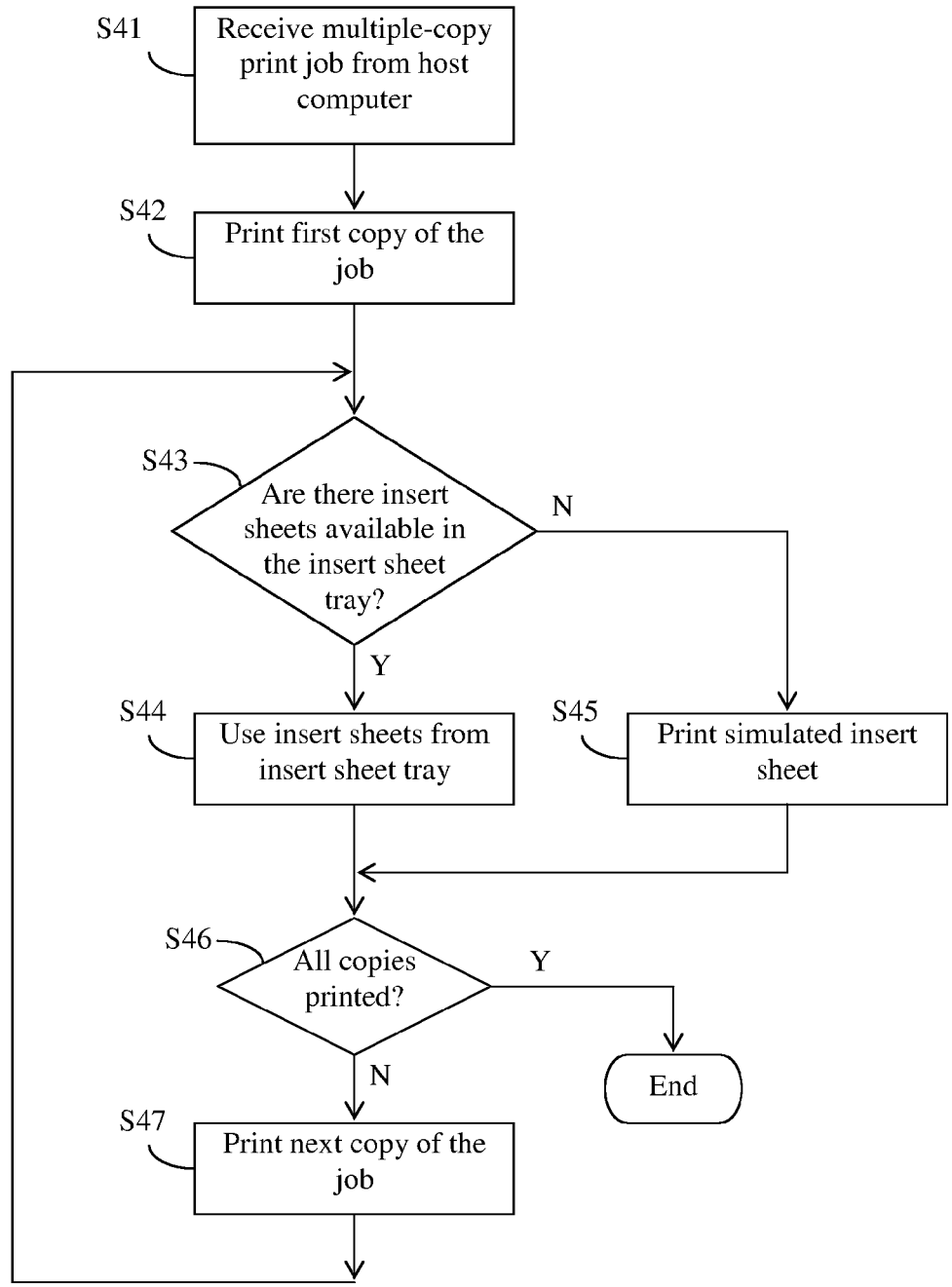
FIG. 4 illustrates a multiple-copy printing method according to another embodiment of the present invention.

In an alternative implementation illustrated in FIG. 4, the printer is equipped with a tray containing conventional insert sheet (e.g. special paper). When printing a multiple-copy print job, the printer uses the conventional insert sheets from this tray as long as there are insert sheets available in the tray (steps S42, S43 and S44). When the insert sheets in the tray are depleted during a print job ("N" in step S43), instead of stopping the printing as a conventional printer would, the printer generates simulated insert sheets and uses them in place of the conventional insert sheets (step S45) to complete the print job (steps S46 and S47).

Figure 6:
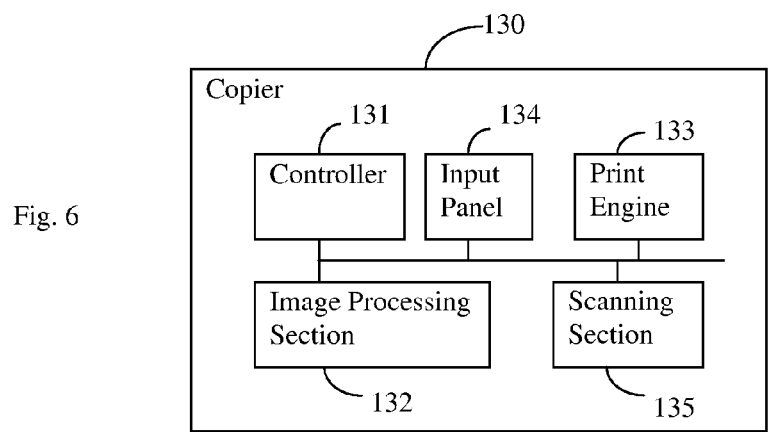
FIG. 6 illustrates a copier in which methods according to embodiments of the present invention can be implemented.

While a print job is described in detail above, the method of generating simulated insert sheets can also be applied to a copy job, where a user supplies an original hard copy document to a copier and requests multiple hard copies to be made from the original copy. The user specifies the number of copies to be made by using, for example, an input panel on the copier. Optionally, using the input panel, the copier may also allow the user to specify whether simulated insert sheets are to be made, and specify a layout and/or content of the simulated insert sheets. The process executed by the copier is similar to that shown in FIG. 2 or that shown in FIG. 3, with appropriate modification of some of the steps. For example, steps S21, S22 and S25 in FIG. 2 and steps S31, S32 and S35 in FIG. 3 are modified so that the copier receives job information (i.e. user instructions) from the input panel and generates image of the document to be copied by scanning the original document. A copier that can implement the above methods is shown in FIG. 6. The copier 130 includes a controller 131, an image processing section 132, an input panel 134, a print engine 133 and a scanning section 135. The controller 121 is programmed to process data and control various other components of the copier to carry out the various methods described herein.

Thus, as used in this disclosure and the appended claims, the term "printer" or "printing device" should be broadly understood to refer to any machine that has a print function, including printers, copiers, and all-in-one machines which have printing, scanning and copying functions. The term "printing" similarly includes both printing and copying, i.e., it refers to producing images on a recording medium either from a data received from an external device such as a host computer or from data generated by scanning an original hard copy.

It will be apparent to those skilled in the art that various modification and variations can be made in the simulated insert sheet printing method and apparatus of the present invention without departing from the spirit or scope of the invention. Thus, it is intended that the present invention cover modifications and variations that come within the scope of the appended claims and their equivalents.

What is claimed is:

1. A method executed by a printing device for producing a print job, wherein the printing device includes an input tray for holding printing sheets and an insert sheet tray for holding insert sheets, the method comprising:
   (a) receiving data representing a document to be printed in the print job;
   (b) receiving job information about the print job, the job information including an instruction to print multiple copies of the document;

(c) printing the requested multiple copies of the document using the printing sheets from the input tray;
(d) determining whether insert sheets are available in the insert sheet tray;
(e) if insert sheets are available in the insert sheet tray, inserting insert sheets from the insert sheet tray between printed copies of the document; and
(f) if insert sheets are unavailable in the insert sheet tray, printing one or more simulated insert sheets using the printing sheets from the input tray as a substitute and inserting them between printed copies of the document.

2. The method of claim 1, wherein the simulated insert sheets include a sequential number on each sheet.

3. The method of claim 1, wherein each simulated insert sheet includes a printed pattern that extends to an edge of the sheet.

4. The method of claim 1, wherein the simulated insert sheets and the copies of the document are printed using paper from the same paper tray of the printing device.

5. The method of claim 1, further comprising:
(g) receiving information specifying a layout or content of the simulated insert sheets,
wherein in step (f) the simulated insert sheets are printed in accordance with the specified layout or content.

6. The method of claim 5,
wherein the information received in step (g) includes a request for a logo pre-stored in the printing device, and
wherein step (f) includes generating one or more raster images of the simulated insert sheets including the pre-stored logo.

7. The method of claim 5,
wherein the information received in step (g) specifies one of a plurality of logos pre-stored in the printing device, and
wherein step (f) includes generating one or more raster images of the simulated insert sheets including the specified pre-stored logo.

8. The method of claim 1, wherein in step (f) the simulated insert sheets are printed in accordance with default layout and content previously stored in the printing device.

9. The method of claim 1,
wherein the job information includes a parameter indicating whether simulated insert sheets are to be printed, and
wherein in step (f) the simulated insert sheets are printed if the parameter indicates that simulated insert sheets are to be printed.

10. The method of claim 1, wherein in steps (a) and (b), the data and the job information are received from a host computer connected to the printing device.

11. The method of claim 1, wherein step (a) includes scanning an original hard copy of the document on the printing device to generate the data representing the document to be printed, and wherein step (b) includes receiving the job information from an input panel of the printing device.

12. The method of claim 1, wherein the job information is in a JDF (Job Definition Format) format.

13. A computer program product comprising a computer usable non-transitory medium having a computer readable code embodied therein for controlling a printing device, wherein the printing device includes an input tray for holding printing sheets and an insert sheet tray for holding insert sheets, the computer readable program code configured to cause the printing device to execute a process for producing a print job, the process comprising the steps of:
(a) receiving data representing a document to be printed in the print job;
(b) receiving job information about the print job, the job information including an instruction to print multiple copies of the document;
(c) printing the requested multiple copies of the document using the printing sheets from the input tray;
(d) determining whether insert sheets are available in the insert sheet tray;
(e) if insert sheets are available in the insert sheet tray, inserting insert sheets from the insert sheet tray between printed copies of the document; and
(f) if insert sheets are unavailable in the insert sheet tray, printing one or more simulated insert sheets using the printing sheets from the input tray as a substitute and inserting them between printed copies of the document.

14. The computer program product of claim 13, wherein the process further comprises:
(g) receiving information specifying a layout or content of the simulated insert sheets,
wherein in step (f) the simulated insert sheets are printed in accordance with the specified layout or content.

15. The computer program product of claim 13, wherein in step (f) the simulated insert sheets are printed in accordance with default layout and content previously stored in the printing device.

16. The computer program product of claim 13,
wherein the job information includes a parameter indicating whether simulated insert sheets are to be printed, and
wherein in step (f) the simulated insert sheets are printed if the parameter indicates that simulated insert sheets are to be printed.

17. The computer program product of claim 13, wherein step (a) includes scanning an original hard copy of the document on the printing device to generate the data representing the document to be printed, and wherein step (b) includes receiving the job information from an input panel of the printing device.

18. The computer program product of claim 13, wherein the job information is in a JDF (Job Definition Format) format.

19. A printing device comprising:
a control and processing section;
an input tray for holding printing sheets;
an insert sheet tray for holding insert sheets; and
a print engine connected to the control and processing section for forming an image on a recording medium,
wherein the control and processing section is programmed to receive data representing a document to be printed in the print job, to receive job information about the print job, the job information including an instruction to print multiple copies of the document, to control the print engine to print the requested multiple copies of the document using the printing sheets from the input tray, to determine whether insert sheets are available in the insert sheet tray, to control the printing device to insert insert sheets from the insert sheet tray between printed copies of the document if insert sheets are available in the insert sheet tray, and to control the print engine to print one or more simulated insert sheets using the printing sheets from the input tray as a substitute and insert them between printed copies of the document if insert sheets are unavailable in the insert sheet tray.

20. The printing device of claim 19, wherein the control and processing section is further programmed to receive information specifying a layout or content of the simulated insert sheets, and wherein the simulated insert sheets are printed in accordance with the specified layout or content.

21. The printing device of claim 19, wherein the simulated insert sheets are printed in accordance with default layout and content previously stored in the printing device.

22. The printing device of claim 19, wherein the job information includes a parameter indicating whether simulated insert sheets are to be printed, and wherein the simulated insert sheets are printed if the parameter indicates that simulated insert sheets are to be printed.

23. The printing device of claim 19, further comprising:
   a scanning section for scanning an original hard copy of the document to generate the data representing the document to be printed; and
   an input panel for inputting the job information.

24. A method executed by a printing device for producing a print job, wherein the printing device includes an input tray for holding printing sheets and an insert sheet tray for holding insert sheets, the method comprising:

(a) receiving data representing a document to be printed in the print job;
(b) receiving job information about the print job, the job information specifying a plurality of page ranges within the document;
(c) printing the document using the printing sheets from the input tray;
(d) determining whether insert sheets are available in the insert sheet tray;
(e) if insert sheets are available in the insert sheet tray, inserting insert sheets from the insert sheet tray between printed copies of the document; and
(f) if insert sheets are unavailable in the insert sheet tray, printing one or more simulated insert sheets using the printing sheets from the input tray as a substitute and inserting them between adjacent page ranges of the printed document.

* * * * *